United States Patent Office 3,365,430
Patented Jan. 23, 1968

3,365,430
COPOLYMERS OF OMEGA-ALKENYL CARBONATES AND SULFUR DIOXIDE
Billy Gene Harper, John B. Gardner, and William S. Pickle, Lake Jackson, Tex., assignors to The Dow Chemical Company, Midland, Mich., a corporation of Delaware
No Drawing. Filed July 16, 1965, Ser. No. 472,719
4 Claims. (Cl. 260—79.3)

This invention relates to polymeric reaction products and more particularly to compositions obtainable by the reaction of sulfur dioxide with omega-alkenyl carbonates.

It is known to the art to prepare copolymers, sometimes referred to as polysulfones, by reacting sulfur dioxide with alpha-olefins e.g. U.S. Patents 2,136,389, 2,602,787 and 2,797,205 J. Am. Chem. Soc., vol. 65, pages 2417–2418 (1943).

According to the present invention moldable polysulfones may be prepared by reacting sulfur dioxide with an omega-alkenyl carbonate having the formula

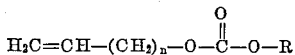

wherein R is a radical selected from cyclic and acyclic saturated hydrocarbon radicals, having from 1 to 12 carbon atoms, aralkyl and alkaryl radicals having from 7 to 12 carbon atoms, the phenyl radical and polyethoxy radicals derived from polyethylene oxide having from 2 to 10 carbon atoms, and $n$ is an integer from 1 to 10.

Illustrative examples of suitable omega-alkenyl carbonates which may be reacted with sulfur dioxide to produce the polysulfones of the present invention include allyl methyl carbonate, allyl butyl carbonate, allyl octyl carbonate, allyl dodecyl carbonate, allyl cycohexyl carbonate, methyl 4-pentenyl carbonate, 7-octenyl pentyl carbonate, allyl phenyl carbonate, allyl benzyl carbonate, 6-heptenyl phenethyl carbonate, allyl tolyl carbonates, allyl xylyl carbonates, allyl cumyl carbonates, allyl 2-ethoxyethyl carbonate, allyl 2-(2-ethoxyethoxy)ethyl carbonate.

The omega-alkenyl carbonates are prepared by methods known to the art as for example, reacting phosgene with at least one alcohol such as allyl alcohol having terminal unsaturation to prepare the omega-alkenyl chloroformate at a temperature between about 0 to 20 degrees C.

The omega-alkenyl chloroformate is then reacted with an aliphatic or aromatic alcohol such as methanol, butanol, dodecyl alcohol, phenol, and benzyl alcohol at about 25–50 degrees C., in the presence of an alkali hydroxide such as sodium or potassium hydroxide, to prepare the omega-alkenyl carbonate.

The copolymerization reaction of $SO_2$ with the omega-alkenyl carbonate is advantageously achieved by bulk polymerization of the mixed monomers although it can be achieved with an inert solvent such as hexane or kerosene, or with excess sulfur dioxide as the reaction medium, or by suspension polymerization.

Polymerization can be effected by the aid of irradiation or by the presence of a chemical catalyst.

When irradiation is employed, the amount of radiation used is from about 0.02 to about 5.0 megarad, and preferably from 0.1 to 0.5 megarad. Any convenient source of gamma rays or high velocity electrons is satisfactory. The rate of radiation may be varied within known practical limits. A chemical catalyst may also optionally be present to supplement polymerization by irradiation, if desired. However, irradiation without the aid of chemical catalyst is a fully satisfactory procedure for effecting polymerization of the $SO_2$ and the omega-alkenyl carbonate mixture.

Among chemical catalysts employed to prepare the polymer are ionic-type catalysts, e.g. $AgNO_3$, $LiNO_3$, and $NH_4NO_3$ (sometimes referred to as a redox catalyst) and the peroxide-type free-radical initiating catalysts, e.g. methyl ethyl ketone peroxide. When an ionic type is employed, the amount is generally from about 0.001 to about 0.5 percent and when the free-radical initiating type is employed, the amount is usually from about 0.05 to 5.0 percent, based on the weight of the omega-alkenyl carbonate present.

In preparing the polysulfones of the present invention, it is generally found that substantially equimolar proportions of the omega-alkenyl carbonate and sulfur dioxide react together. However, starting molar ratios of sulfur dioxide to omega-alkenyl carbonate can range from 1 to 50:1 or more to facilitate the polymerization of the reactants and to provide, if desired, a reaction vehicle of liquid sulfur dioxide.

Polymerization occurs readily at temperatures ranging from about −50 degrees C. to 50 degrees C. and preferably from 0 degrees C. to 30 degrees C. Sufficient pressure is employed to maintain the reaction mixture substantially completely in a liquid phase, i.e. about 1 to 20 atmospheres; however, the autogenous pressure developed at the particular reaction conditions employed is preferred.

The sulfur dioxide/omega-alkenyl carbonate copolymers of the present invention either alone or modified with fillers, synthetic resins and plasticizers find use as molding compositions for a variety of uses. The copolymers prepared herein are also useful as coating compositions when dissolved in suitable solvents, either alone or in admixture with other materials of the type enumerated above. Such compositions are useful for coating all kinds of surfaces wherein a waterproof coating is required such as wood, metal and paper.

To illustrate the manner in which the invention may be carried out, the following examples are given. It is to be understood, however, that the examples are for the purpose of illustration and the invention is not to be regarded as limited to any of the specific materials or conditions recited therein.

Example I

Thirty-six grams of allyl butyl carbonate and 28 grams of sulfur dioxide were placed in a container cooled to −40 degrees C. The container was closed, allowed to warm to room temperature and was irradiated with gamma radiation emitted by a cobalt 60 source to provide a dose of 0.11 megarad. The melting point of the resulting polymeric product was 190 degrees C., and it decomposed at 215 degrees C. The polymeric product was insoluble in water and methanol, swelled in acetone, and was soluble in tetrahydrofuran. A yield of 8 grams of the copolymer was obtained.

Analysis of the polymer showed that the molar proportion of $SO_2$ groups to the allyl butyl carbonate was about 1:1.

A portion of the polymeric product was compression molded at 140 degrees C. and 10,000 pounds platen pressure for three minutes to form a white, translucent, flexible film.

Example II

To 31 grams of allyl dodecyl carbonate was added 163 grams of $SO_2$ and 0.5 gram of methyl ethyl ketone peroxide in an open vessel and the reactants stirred until the solution became very thick and the vigorous reaction of the materials ceased. The polymer was precipitated by adding methanol to the reaction mixture. The recovered polymer was insoluble in water and methanol, swelled in acetone and was soluble in tetrahydrofuran. The polymer melted at 90 degrees C. and decomposed at 140 degrees C. The polymer was insoluble in water and methanol, swelled in acetone and was soluble in tetrahydrofuran.

*Example III*

To 120 g. of allyl phenyl carbonate in 350 ml. of deionized water containing 3 ml. of a 33% aqueous solution of sodium lauryl sulfate and 0.667 ml. of a 75% mineral spirits solution of t-butyl peroxypivalate was added 720 g. of sulfur dioxide over a period of 24 hours at the rate of 0.5 g./min. The reaction was conducted at a temperature of about 25 degrees C. with continuous stirring. The suspension of polymer was then separated from the aqueous medium, washed with isopropyl alcohol and dried under vacuum at room temperature. Analysis showed the polymer to contain about a 5:4 molar ratio of the allyl monomer to sulfur dioxide. A sample of this polymer which was compression molded at 100 degrees C. and 20,000 p.s.i., formed a white, flexible film.

In a similar manner, copolymers similar to the foregoing may be obtained when equivalent amounts of any of the other mentioned allyl carbonates are reacted with $SO_2$ in place of those set forth in the above examples.

What is claimed is:
1. A solid copolymer comprising the reaction product of sulfur dioxide and an omega-alkenyl carbonate having the formula

$$H_2C=CH-(CH_2)_n-O-\overset{O}{\underset{\parallel}{C}}-O-R$$

wherein R is selected from the group consisting of cyclic and acyclic saturated hydrocarbon radicals having 1 to 12 carbon atoms, aralkyl radicals having from 7 to 12 carbon atoms, alkaryl radicals having from 7 to 12 carbon atoms, the phenyl radical and polyethoxy radicals derived from polyethylene oxide having from 2 to 10 carbon atoms and wherein $n$ is an integer from 1 to 10, said reaction product being produced solely by the reaction of the sulfur dioxide with the alkenyl moieties of said omega-alkenyl carbonate.

2. The copolymer of claim 1, wherein the omega-alkenyl carbonate is allyl butyl carbonate.

3. The copolymer of claim 1, wherein the omega-alkenyl carbonate is allyl dodecyl carbonate.

4. The copolymer of claim 1, wherein the omega-alkenyl carbonate is allyl phenyl carbonate.

References Cited

UNITED STATES PATENTS 2,314,067   3/1943   Barnett et al. _____ 260—79.3

JOSEPH L. SHOFER, *Primary Examiner.*

D. K. DENENBERG, *Assistant Examiner.*